(12) United States Patent
Chou et al.

(10) Patent No.: US 9,360,667 B2
(45) Date of Patent: Jun. 7, 2016

(54) BEAM SPLITTING MODULE AND PROJECTOR DEVICE USING THE SAME

(71) Applicant: INDUSTRIAL TECHNOLOGY RESEARCH INSTITUTE, Hsinchu (TW)

(72) Inventors: Ming-Chieh Chou, Tainan (TW); Yi-Cheng Chen, New Taipei (TW); Yao-Hui Lee, Tainan (TW); Han-Wei Su, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 142 days.

(21) Appl. No.: 14/260,944

(22) Filed: Apr. 24, 2014

(65) Prior Publication Data

US 2015/0108782 A1 Apr. 23, 2015

(30) Foreign Application Priority Data

Oct. 21, 2013 (TW) .............................. 102137976 A (51) Int. Cl.
*G03B 21/28* (2006.01)
*G02B 27/01* (2006.01)
*G03B 21/20* (2006.01)

(52) U.S. Cl.
CPC .......... *G02B 27/0101* (2013.01); *G03B 21/208* (2013.01); *G03B 21/2066* (2013.01); *G03B 21/28* (2013.01)

(58) Field of Classification Search
CPC ...... G03B 21/20; G03B 21/28; G03B 21/208; G03B 21/2066; G02B 27/0101; G02B 27/145; G02B 27/1046; H04N 9/3105; H04N 9/3167; H04N 9/3197

USPC .............................................. 353/20, 99, 119
See application file for complete search history.

(56) References Cited

U.S. PATENT DOCUMENTS 3,932,702 A * 1/1976 Shelley .................. G09B 9/326
 348/123
6,714,331 B2 3/2004 Lewis et al.
(Continued)

FOREIGN PATENT DOCUMENTS

CN 101893760 A 11/2010
CN 102791510 A 11/2012
(Continued)

OTHER PUBLICATIONS

Fan Chao et al., "Development of a Micromirror Based Laser Vector Scanning Automotive HUD", 2011 IEEE International Conference on Mechatronics and Automation (ICMA), Aug. 7-10, 2011, pp. 75-79.
(Continued)

*Primary Examiner* — Sultan Chowdhury
(74) *Attorney, Agent, or Firm* — Rabin & Berdo, P.C.

(57) ABSTRACT

A beam splitting module and a projector device using the same are provided. The beam splitting module comprises a projector, a first reflective mirror and a second reflective mirror. The projector projects a first split image, a second split image and a third split image. The first reflective mirror reflects the first split image to a real image forming plate to form a first projection image. The second reflective mirror reflects the second split image to the real image forming plate to form a second projection image. The third split image is projected on the real image forming plate through a space between the first reflective mirror and the second reflective mirror to form a third projection image.

35 Claims, 12 Drawing Sheets

(56) References Cited

U.S. PATENT DOCUMENTS

| | | |
|---|---|---|
| 7,060,343 B2 | 6/2006 | Freeman |
| 7,413,233 B1 | 8/2008 | Jung |
| 7,508,356 B2 | 3/2009 | Kanamori et al. |
| 7,903,048 B2 | 3/2011 | Yanagisawa |
| 8,591,038 B2 * | 11/2013 | Sugano ............... G03B 21/10 348/788 |
| 2003/0048420 A1 * | 3/2003 | Janssen ............. G02B 27/283 353/30 |
| 2005/0154505 A1 | 7/2005 | Nakamura et al. |
| 2006/0071877 A1 * | 4/2006 | Kanamori ........... G02B 17/023 345/7 |
| 2008/0218870 A1 | 9/2008 | Lind et al. |
| 2013/0021224 A1 | 1/2013 | Fujikawa et al. |
| 2013/0083039 A1 | 4/2013 | Chiang et al. |

FOREIGN PATENT DOCUMENTS

| | | |
|---|---|---|
| CN | 103048786 A | 4/2013 |
| DE | 102012106638 A1 | 1/2013 |
| JP | 2006-001377 A | 1/2006 |
| JP | 2007-292956 A | 11/2007 |
| JP | 4857885 B2 | 1/2012 |
| TW | 289801 | 11/1996 |
| TW | 201245764 A | 11/2012 |
| TW | 201310066 A | 3/2013 |
| TW | 201316034 A | 4/2013 |

OTHER PUBLICATIONS

Okumura, H. et al., "Hyperrealistic Head-Up-Display for Automotive Application", 2011 IEEE International Conference on Consumer Electronics (ICCE), Jan. 9-12 , 2011, pp. 875-876.

Tangmanee, K et al., "Effects of Guided Arrows on Head-Up Display Towards the Vehicle Windshield", 2012 Southeast Asian Network of Ergonomics Societies Conference (SEANES), Jul. 9-12, 2012, pp. 1-6.

Charissis, V. et al, "Evaluation of Prototype Automotive Head-Up Display Interface: Testing Driver's Focusing Ability Through a VR Simulation", Proceedings of the 2007 IEEE Intelligent Vehicles Symposium, Jun. 13-15, 2007, pp. 560-565.

Park Min Hee et al., "Development of Circumstance-Based Variable Information Structure for Head Up Display in a Car", 2011 3rd International Conference on Data Mining and Intelligent Information Technology Applications (ICMIA), Oct. 24-26, 2011, pp. 127-130.

Taiwanese Office Action dated Oct. 7, 2015.

Chinese Office Action dated Nov. 11, 2015.

* cited by examiner

BEAM SPLITTING MODULE AND PROJECTOR DEVICE USING THE SAME

This application claims the benefit of Taiwan application Serial No. 102137976, filed Oct. 21, 2013, the disclosure of which is incorporated by reference herein in its entirety.

TECHNICAL FIELD

The disclosure relates in general to a beam splitting module and a projector device using the same, and more particularly to a beam splitting module with reflective mirror and a projector device using the same.

BACKGROUND

Head up display (HUD) used in transportation vehicles allows drivers to check driving information on an instrument panel without looking downward. Therefore, the frequency at which the drivers head down to check the instrument panel can be reduced. However, since an ordinary HUD only displays vehicle speed, its application field is limited.

SUMMARY

According to one embodiment, a beam splitting module is provided. The beam splitting module comprises a projector, a first reflective mirror and a second reflective mirror. The projector projects a first split image, a second split image and a third split image. The first reflective mirror reflects the first split image to form a first projection image. The second reflective mirror reflects the second split image to form a second projection image. The third split image is projected through a space between the first reflective mirror and the second reflective mirror to form a third projection image.

According to another embodiment, a beam splitting module is provided. The beam splitting module comprises a projector, a first reflective mirror, a second reflective mirror, and a third reflective mirror. The projector projects a first split image, a second split image and a third split image. The first reflective mirror reflects the first split image to form a first projection image. The second reflective mirror reflects the second split image to form a second projection image. The third reflective mirror is located between the first reflective mirror and the second reflective mirror for reflecting the third split image to form a third projection image.

The above and other aspects of the disclosure will become better understood with regard to the following detailed description of the non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
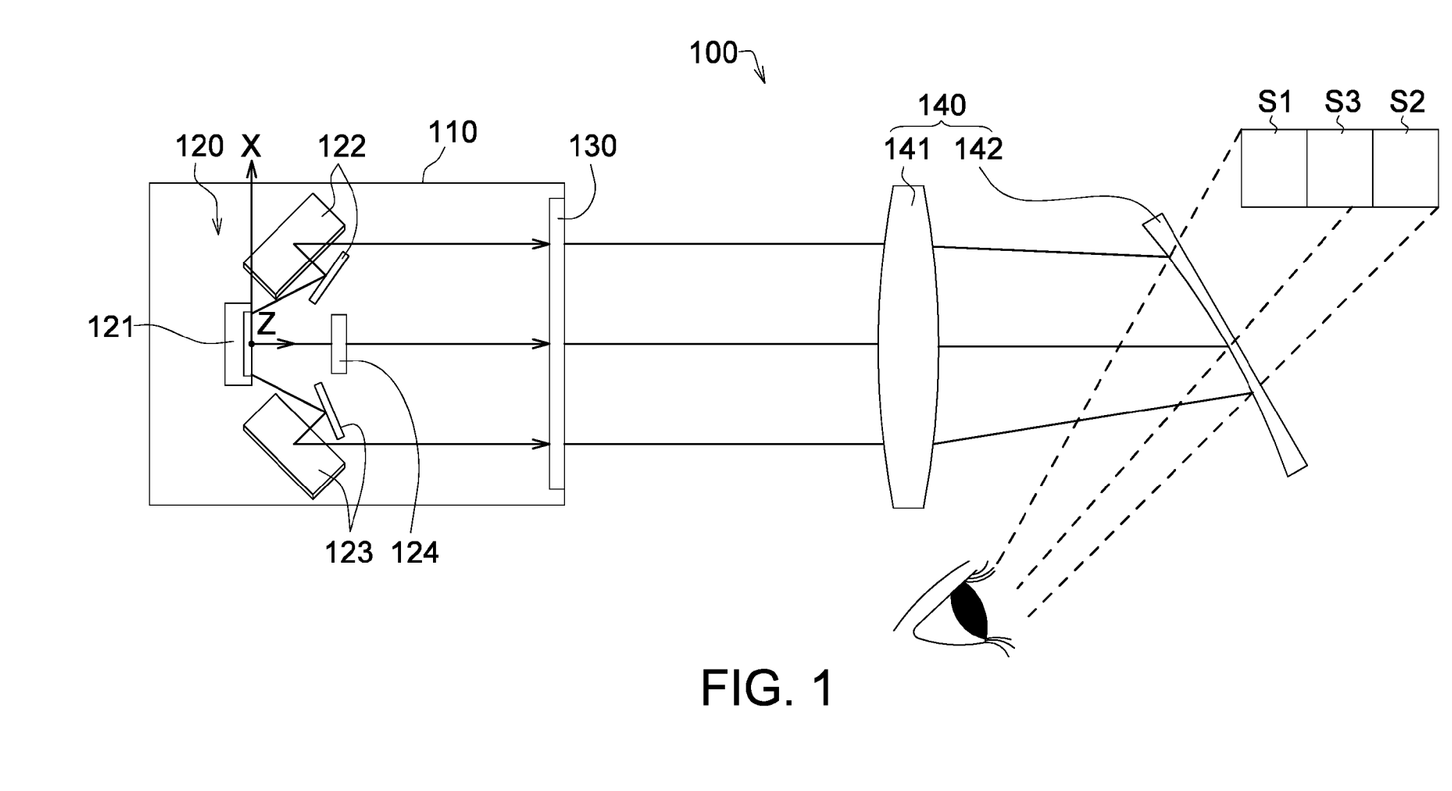
FIG. 1 is a schematic diagram of a projector device according to an embodiment of the disclosure.

Referring to FIG. 1, a schematic diagram of a projector device according to an embodiment of the disclosure is shown. The projector device 100 comprises a housing 110, a beam splitting module 120, a real image forming plate 130, and a virtual image forming plate 140. The beam splitting module 120 and the real image forming plate 130 can be disposed inside the housing 110 for projecting a frame to the real image forming plate 130. In another embodiment, the beam splitting module 120, the real image forming plate 130 and a virtual image forming lens 141 of the virtual image forming plate 140 can be jointly disposed inside the housing 110.

The real image forming plate 130, such as a translucent diffuser, can be disposed within a focal distance of the virtual image forming plate 140. A frame can be projected on the real image forming plate 130 to form a real image frame. In the present embodiment, the quantity of real image forming plate 130 can be single. The real image forming plate 130 can be realized by a plate with poor flexibility or a flexible plate. When the real image forming plate 130 is realized by a flexible plate, the real image forming plate 130 is thin and is virtually a film structure, which can be pasted on the housing 110 or an external element such as a windshield.

After a real image frame coming from the real image forming plate 130 is projected on the virtual image forming plate 140 to be converted into a virtual image frame. To put it in greater details, the virtual image forming plate 140 comprises at least a virtual image forming lens 141 and a semi-reflective mirror 142. The virtual image forming lens 141 comprises at least a concave lens, at least a convex lens or a combination thereof. The embodiment of the disclosure does not restrict the type of the virtual image forming lens, and any types would do as long as the real image frame can form a virtual image after passing through the virtual image forming lens 141. The real image frame coming from the real image forming plate 130 is converted into a virtual image frame by the virtual image forming lens 141, and then is projected on the semi-reflective mirror 142. When the virtual image frame is projected on the semi-reflective mirror 142, the light is reflected back to human eyes. Due to virtual imaging, the viewer will feel that the image is formed at a far position. That is, through the semi-reflective mirror 142, human eyes will see a virtual image frame projected at a far position. Thus, the interval between the distance at which the viewer views an image projected at a near distance and the distance at which the viewer views a virtual image frame projected at a far position can be reduced, and the driver is less troubled with the switch between viewing a near image and viewing a far image.

In another embodiment, the projector device 100 can omit the virtual image forming plate 140, and directly projects a real image frame on the real image forming plate 130. Under such design, the real image forming plate 130 can be realized by a light-proof element such as a white screen. In addition, the real image forming plate 130 and/or the virtual image forming plate 140 can be integrated to the beam splitting module 120 and become a sub-component of the beam splitting module 120.

In an embodiment, the projector device 100 can be realized by a head-mounted display. In another embodiment, the projector device 100 can be realized by a head up display (HUD) fixed on an instrument panel, a sun visor, a rearview mirror or a suitable position of a vehicle, so that the projection frame is projected towards the windshield. The projector device 100 can selectively omit the semi-reflective mirror 142, and the function of the semi-reflective mirror 142 can be replaced by the windshield. Under such design, considering the optical refraction angle of the windshield, the projector device 100 can be disposed near the instrument panel. However, when the optical refraction angle is not subjected to any restrictions, the projector device 100 can be disposed at any suitable positions. In another embodiment, a reflective film can be pasted on the windshield. Under such design, the projector device 100 can omit the semi-reflective mirror 142, and directly project the projection frame on the reflective film. In an alternate embodiment, the projector device 100 can selectively omit the real image forming plate 130, the virtual image forming plate 140 and the semi-reflective mirror 142, and directly project the real image frame on the windshield.

The beam splitting module 120 comprises a projector 121, a first reflective mirror 122, a second reflective mirror 123 and a lens 124 (selectively). Detailed structure of the beam splitting module 120 are described below.

Figure 2:
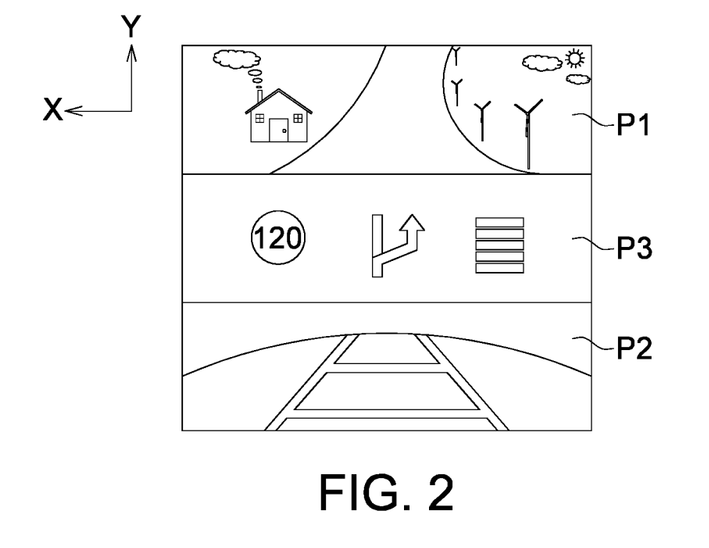
FIG. 2 is a projection image of a projector of FIG. 1.

Referring to FIG. 2, a projection image of a projector of FIG. 1 is shown. The projector 121, which adopts a laser light source, an LED light source or any suitable light source, projects a first split image P1, a second split image P2, and a third split image P3. The first split image P1, the second split image P2 and the third split image P3 are arranged along a first direction. In the present embodiment, the first direction is a vertical direction, such as a Y direction. The first split image P1, the second split image P2 and the third split image P3 respectively display different driving information, such as speed, remaining fuel, navigation screen or traffic reports, so that the driver can view several driving information at the same time.

The projector 121 adopting a laser light source, having the advantages of high-power optical engine, easy miniaturization and sustained focusing, can reduce required space of optical lens required in an imaging system and decrease the volume of the optical engine system. Besides, the projection frame of the projector 121 adopting a laser light source is superior to the projection frame of the projector 121 adopting an LED light source in terms of contrast, brightness, sharpness, color saturation and frame uniformity.

Figure 3:
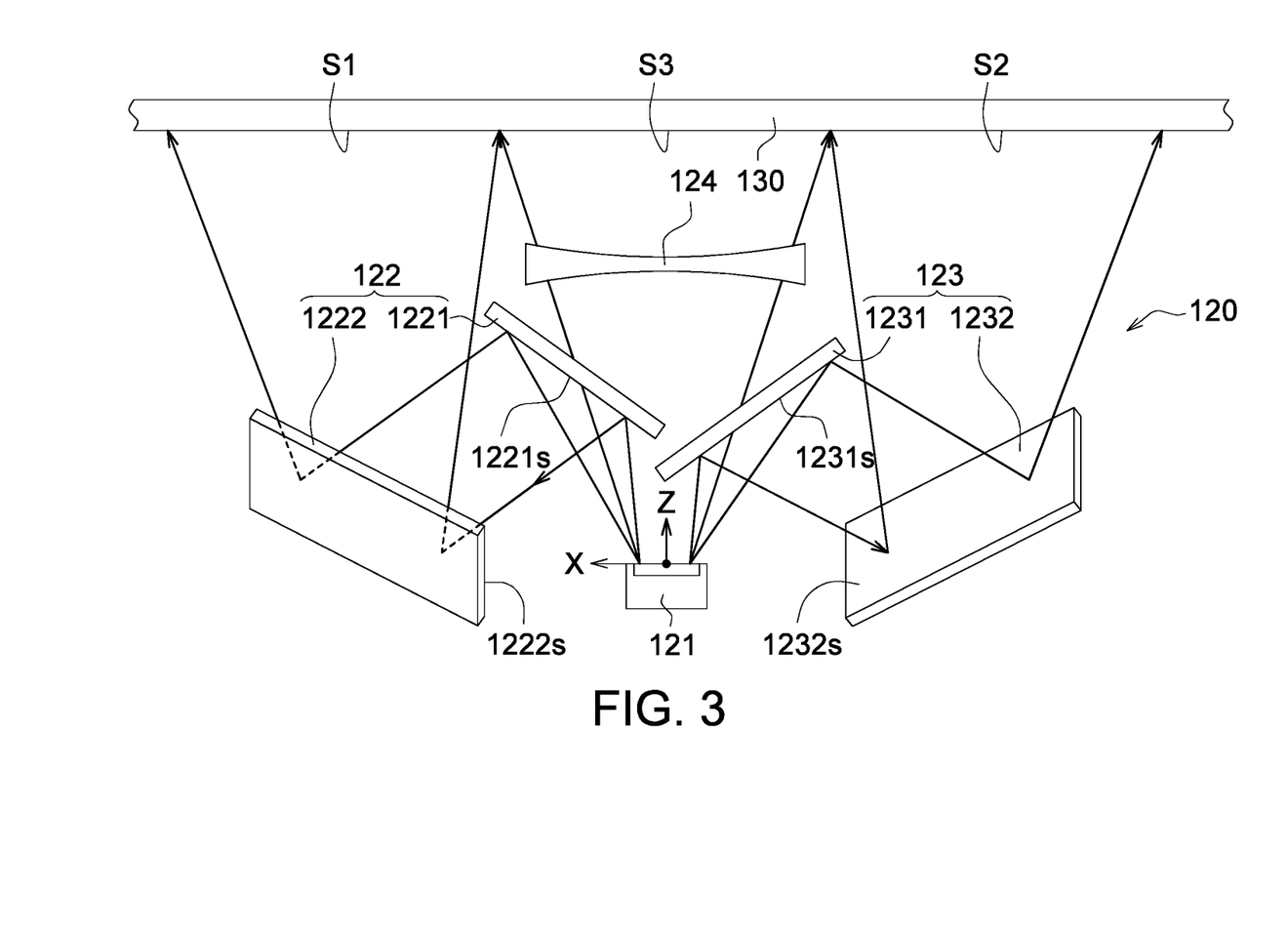
FIG. 3 is a schematic diagram of a beam splitting module of FIG. 1.

Referring to FIG. 3, a schematic diagram of a beam splitting module 120 of FIG. 1 is shown. In the present embodiment, the first reflective mirror 122 and the second reflective mirror 123 are separated from each other, but the present embodiment of the disclosure is not limited thereto. The first reflective mirror 122 reflects the first split image P1 (illustrated in FIG. 2) to form a first projection image S1. The first projection image S1 is projected on the real image forming plate 130 to form a first real image. For instance, the first reflective mirror 122 comprises a first sub-reflective mirror 1221 and a second sub-reflective mirror 1222. A reflective surface 1221s of the first sub-reflective mirror 1221 faces towards the second sub-reflective mirror 1222 ("faces towards" refers to the range of the light reflected from the reflective surface 1221s covering the second sub-reflective mirror 1222) but faces away from the real image forming plate 130. A reflective surface 1222s of the second sub-reflective mirror 1222 faces towards the real image forming plate 130 ('faces towards" refers to the range of the light reflected from the reflective surface 1222s covering the real image forming plate 130). The first split image P1 is sequentially reflected by the first sub-reflective mirror 1221 and the second sub-reflective mirror 1222 and then projected on the real image forming plate 130. The first sub-reflective mirror 1221 is such as a glass mirror or coated mirror. The structure of the second sub-reflective mirror 1222 is similar to that of the first sub-reflective mirror 1221, and the details are not repeated here for simplicity.

The second reflective mirror 123 reflects the second split image P2 (illustrated in FIG. 2) to form a second projection image S2. The second projection image S2 is projected on the real image forming plate 130 to form a second real image. For instance, the second reflective mirror 123 comprises a third sub-reflective mirror 1231 and a fourth sub-reflective mirror 1232. A reflective surface 1231s of the third sub-reflective mirror 1231 faces towards the fourth sub-reflective mirror 1232 but faces away from the real image forming plate 130. A reflective surface 1232s of the fourth sub-reflective mirror 1232 faces towards the real image forming plate 130. The second split image P2 is sequentially reflected by the third sub-reflective mirror 1231 and the fourth sub-reflective mirror 1232 and then projected on the real image forming plate 130. The structures of the third sub-reflective mirror 1231 and the fourth sub-reflective mirror 1232 are similar to that of the first sub-reflective mirror 1221, and the details are not repeated here for simplicity.

Figure 4:
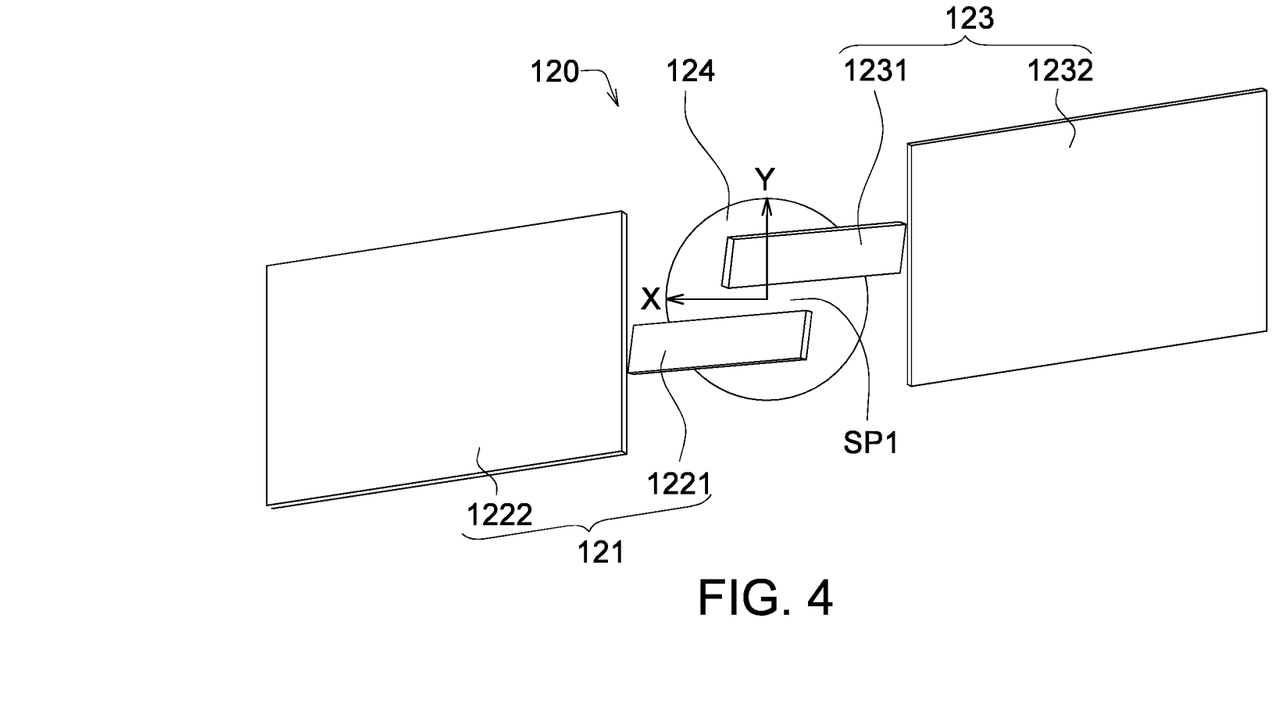
FIG. 4 is a schematic diagram of the beam splitting module of FIG. 3 viewed along the direction Z.

Referring to FIG. 4, a schematic diagram of the beam splitting module 120 of FIG. 3 viewed along the direction Z is shown. The third split image P3 (illustrated in FIG. 2) can be projected through a space SP1 between the first reflective mirror 122 and the second reflective mirror 123 to form a third projection image S3 (illustrated in FIG. 3). The third projection image S3 is projected on the real image forming plate 130 to form a third real image. No physical elements are disposed in the space SP1 to avoid the third split image P3 being over refracted. The first projection image S1, the second projection image S2 and the third projection image S3 are arranged along a second direction different from the first direction. For instance, the second direction is a horizontal direction, such as X direction perpendicular to Y direction.

Figure 5:
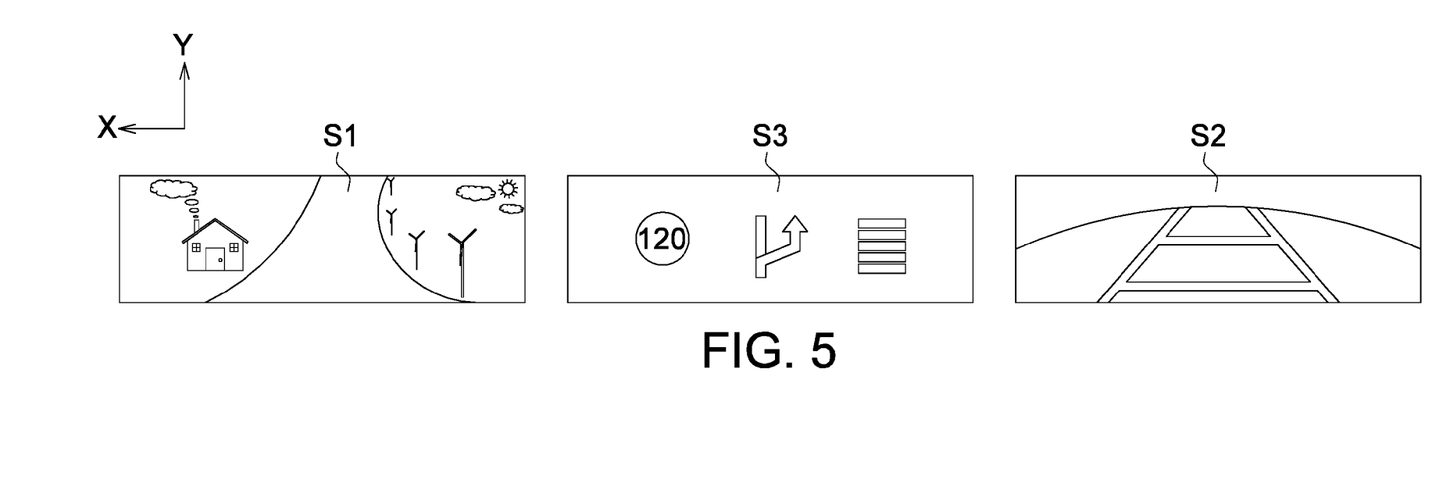
FIG. 5 is a schematic diagram of a projection image of FIG. 3.

Referring to FIG. 5, a schematic diagram of a projection image of FIG. 3 is shown. Since the first reflective mirror 122 (illustrated in FIG. 3) of the beam splitting module 120 collaborate with the second reflective mirror 123 (illustrated in FIG. 3), the first split image P1 (illustrated in FIG. 2), the second split image P2 (illustrated in FIG. 2) and the third split image P3 (illustrated in FIG. 2) form the first projection image S1, the second projection image S2 and the third projection image S3 respectively. Since the first reflective mirror 122 (illustrated in FIG. 3), the projector 121 and the second reflective mirror 123 (illustrated in FIG. 3) of the beam splitting module 120 are substantially arranged along the second direction, the first projection image S1, the second projection image S2 and the third projection image S3 substantially are also arranged along the second direction.

The lens 124 is disposed at a position corresponding to the space SP1 for enlarging or reducing the third split image P3 entering to the lens 124, so that the size of the third projection image S3 is close to that of the first projection image S1 and the second projection image S2. In addition, when the third split image P3 is to be enlarged, the lens 124 can be realized by a concave lens or a dual concave lens; when the third split image P3 is be reduced, the lens 124 can be realized by a convex lens or a dual convex lens. In an embodiment, the lens 124 is a dual concave lens with a diameter being about 20 mm, a thickness being about 0.1 mm and a curvature being about 0.035. In another embodiment, the lens 124 can also be omitted.

In an embodiment, the position coordinates and angles of the first sub-reflective mirror 1221, the second sub-reflective mirror 1222, the third sub-reflective mirror 1231, the fourth sub-reflective mirror 1232 and the lens 124 are as indicated in Table 1. Here, position coordinates are defined by relative positions between the geometric center of an element and an original point exemplified by the projector 121. Angle A1 represents an angle rotated around the X axis, angle A2 represents an angle rotated around the Y axis, and angle A3 represents an angle rotated around the Z axis.

TABLE 1

|  | Position (mm) | | | Angle (°) | | |
| --- | --- | --- | --- | --- | --- | --- |
|  | X | Y | Z | A1 | A2 | A3 |
| First Sub-Reflective Mirror | −5 | 4.2 | 17 | 20° | −40° | 8° |
| Second Sub-Reflective Mirror | −32 | 6 | 12 | 17° | −34° | 0° |
| Third Sub-Reflective Mirror | 5 | −4.2 | 17 | −20° | 40° | 8° |
| Fourth Sub-Reflective Mirror | 32 | −6 | 12 | −17° | 34° | 0° |
| Lens | 0 | 0 | 24.5 | — | — | — |

When the first sub-reflective mirror 1221, the second sub-reflective mirror 1222, the third sub-reflective mirror 1231, the fourth sub-reflective mirror 1232 and the lens 124 are disposed according to the coordinates illustrated in Table 1, the first projection image S1, the second projection image S2 and the third projection image S3 can be formed along a direction different from the first direction. However, relative positions among the first sub-reflective mirror 1221, the second sub-reflective mirror 1222, the third sub-reflective mirror 1231, the fourth sub-reflective mirror 1232 and the lens 124 are not subjected to any restrictions in the embodiment of the disclosure, and any relative positions would do as long as the first projection image S1, the second projection image S2 and the third projection image S3 are arranged along a direction different from that of the split image.

Figure 6:
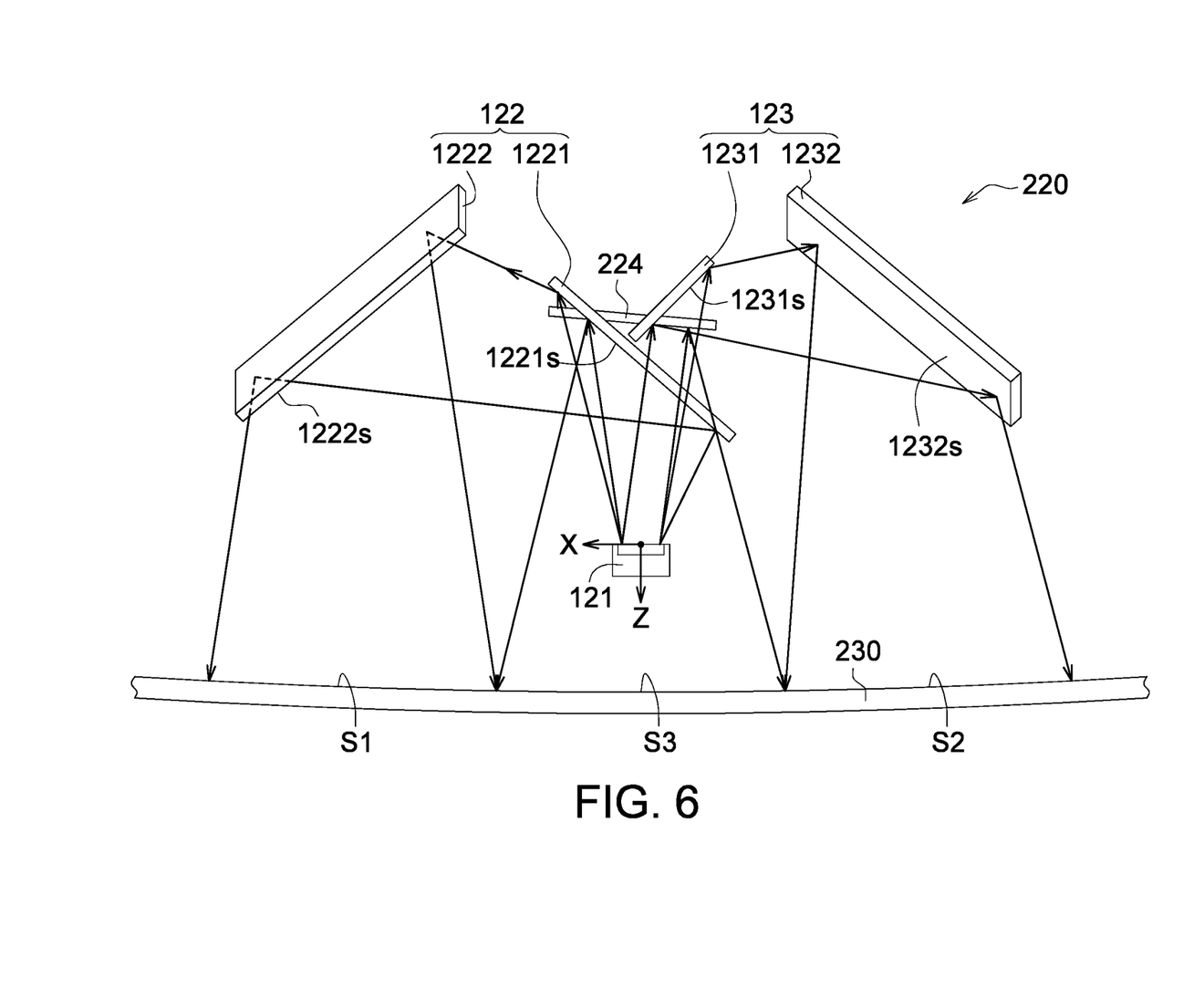
FIG. 6 is a schematic diagram of a beam splitting module according to another embodiment of the disclosure.

Referring to FIG. 6, a schematic diagram of a beam splitting module according to another embodiment of the disclosure is shown. The beam splitting module 220 comprises a projector 121, a first reflective mirror 122, a second reflective mirror 123, a third reflective mirror 224 and an image correction unit 225. The beam splitting module 220 can be used in the projector device 100 or the projector device 200. The first reflective mirror 122 reflects the first split image P1 (illustrated in FIG. 2) to form a first projection image S1. The first projection image S1 is projected on the real image forming plate 230 to form a first real image. For instance, the first reflective mirror 122 comprises a first sub-reflective mirror 1221 and a second sub-reflective mirror 1222. A reflective surface 1221s of the first sub-reflective mirror 1221 faces towards the second sub-reflective mirror 1222 and the real image forming plate 230. A reflective surface 1222s of the second sub-reflective mirror 1222 faces towards the real image forming plate 230. The first split image P1 is sequentially reflected by the first sub-reflective mirror 1221 and the second sub-reflective mirror 1222 and projected on the real image forming plate 230.

The second reflective mirror 123 reflects the second split image P2 (illustrated in FIG. 2) to form a second projection image S2. The second projection image S2 is projected on the real image forming plate 230 to form a second real image. For instance, the second reflective mirror 123 comprises a third sub-reflective mirror 1231 and a fourth sub-reflective mirror 1232. A reflective surface 1231s of the third sub-reflective mirror 1231 faces towards the fourth sub-reflective mirror 1232 and the real image forming plate 230. A reflective surface 1232s of the fourth sub-reflective mirror 1232 faces towards the real image forming plate 230. The second split image P2 is sequentially reflected by the third sub-reflective mirror 1231 and the fourth sub-reflective mirror 1232 and projected on the real image forming plate 230.

The third reflective mirror 224 is located at a space (viewed from a Z direction) between the first reflective mirror 122 and the second reflective mirror 123 for reflecting the third split image P3 (illustrated in FIG. 2) to form a third projection image S3. The third projection image S3 is projected on the real image forming plate 230 to form a third real image. Since the first reflective mirror 122, the second reflective mirror 123 and the third reflective mirror 224 of the beam splitting module 220 are substantially arranged along a second direction, the first projection image S1, the second projection image S2 and the third projection image S3 are substantially arranged along the second direction. The second direction is different from the direction of the split frame (the first direction).

The material of the real image forming plate 230 can be similar to that of the real image forming plate 130, and the details are not repeated here for simplicity. In the present embodiment, the real image forming plate 230 has a concave surface 230s, and the first projection image S1, the second projection image S2 and the third projection image S3 are projected on the concave surface 230s. Due to the design of the concave surface 230s, the degree of distortion of the first projection image S1, the second projection image S2 and the third projection image S3 projected on the concave surface 230s is reduced. In another embodiment, the real image forming plate 230 can be replaced with the real image forming plate 130.

Figure 7:
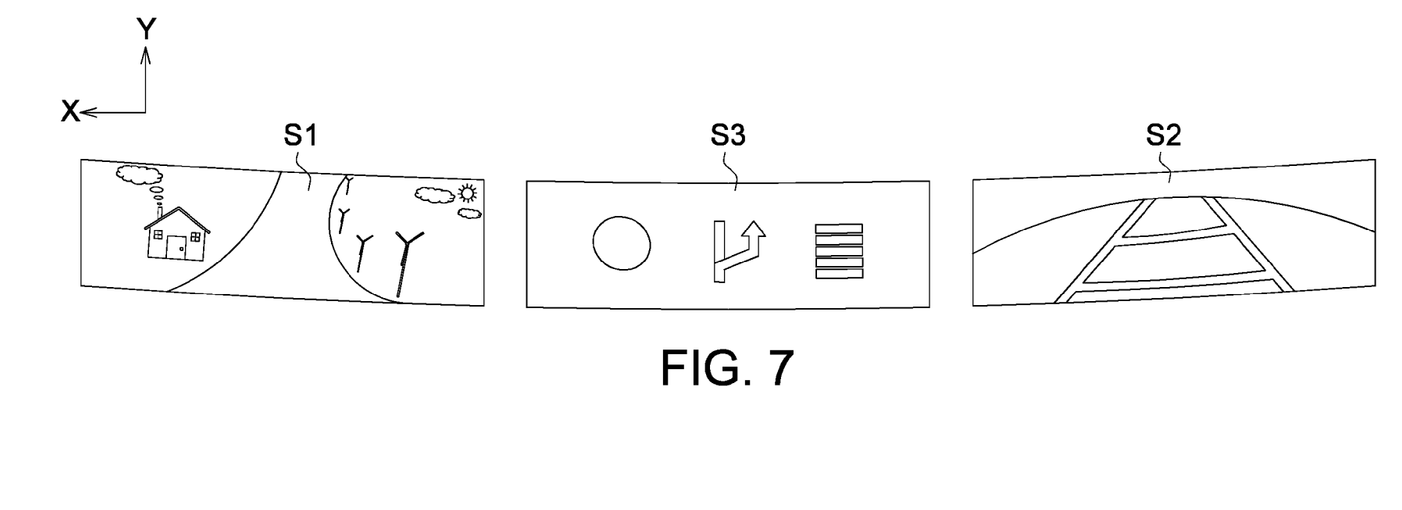
FIG. 7 is a schematic diagram of first projection image, second projection image and third projection image FIG. 6.

Referring to FIG. 7, a schematic diagram of first projection image S1, second projection image S2 and third projection image S3 of FIG. 6 is shown. In an embodiment, at least one of the first projection image S1, the second projection image S2 and the third projection image S3 forms a distorted appearance. Under such circumstances, the image correction unit 225 can use firmware or software to adjust the distorted projection image and make the distorted projection image close to a rectangle or make the first projection image S1, the second projection image S2 and the third projection image S3 have similar appearance and/or size. For instance, the degree of distortion of the first projection image S1 and the third projection image S3 located in the edge of the concave surface 230s is worse than that of the second projection image S2 located in the middle region of the concave surface 230s. In response to an analysis indicating that the first projection image S1 is distorted clockwise and that the third projection image S3 is distorted anti-clockwise, the image correction unit 225 anti-distorts the first projection image S1 anti-clockwise and anti-distorts the third projection image S3 clockwise to make the first projection image S1 and the third projection image S3 close to a rectangle or make the appearance and/or size of the first projection image S1 and the third projection image S3 similar to that of the second projection image S2. In an embodiment, the image correction unit 225 can correct the image by using such as image distortion pre-compensation technique.

Moreover, if image correction is required, the beam splitting module 220 comprises the image correction unit 225.

Figure 8:
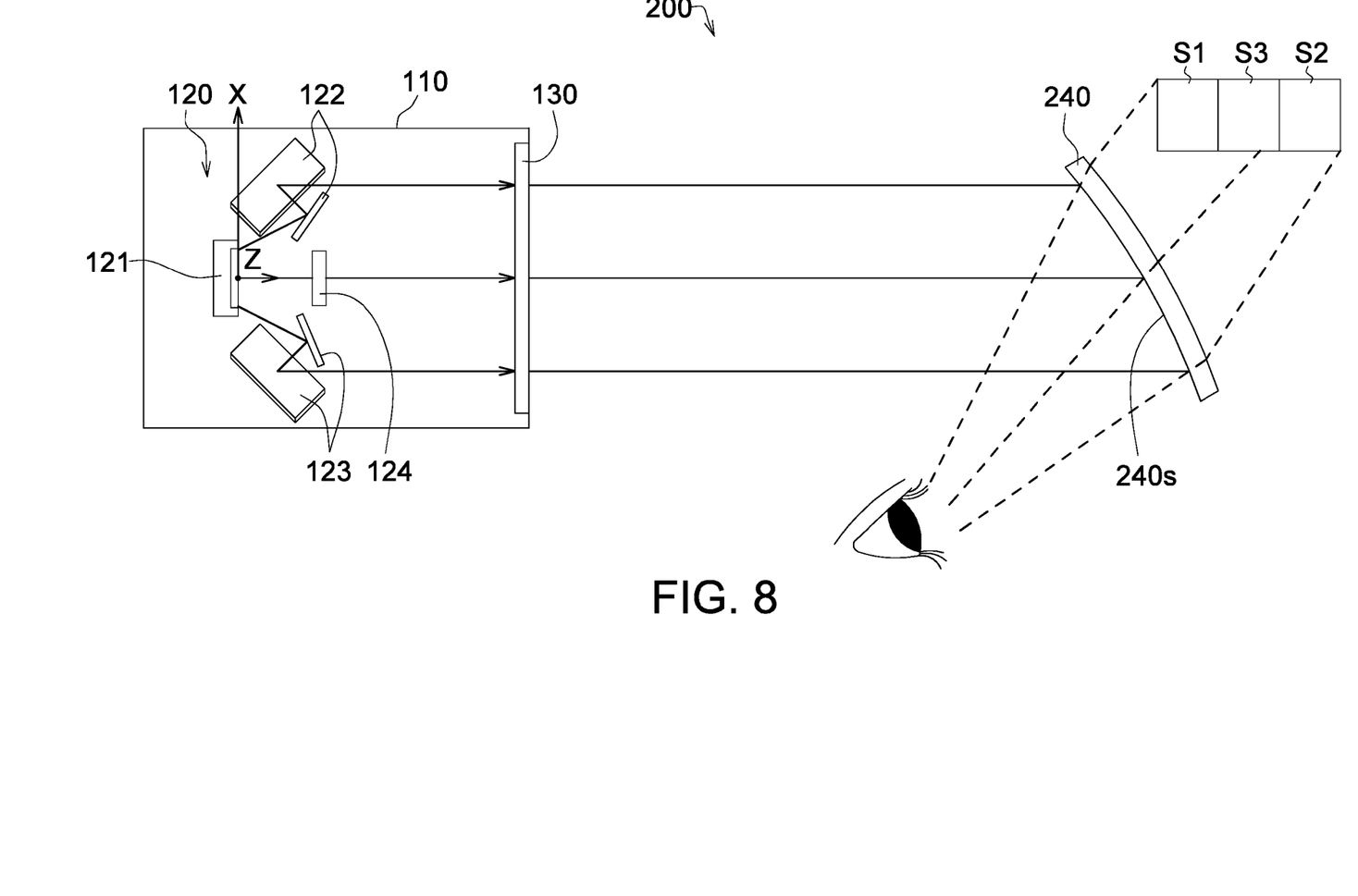
FIG. 8 a schematic diagram of a projector device according to another embodiment of the disclosure.

Referring to FIG. 8, a schematic diagram of a projector device according to another embodiment of the disclosure is shown. The projector device 200 comprises a housing 110, a beam splitting module 120, a real image forming plate 130 and a virtual image forming plate 240. The projector device 300 of the present embodiment is different from the projector device 100 in that the virtual image forming plate 240 is a concave semi-reflective mirror which is a one-piece type optical element and has both functions of the virtual image forming lens 141 and the semi-reflective mirror 142.

Figure 9:
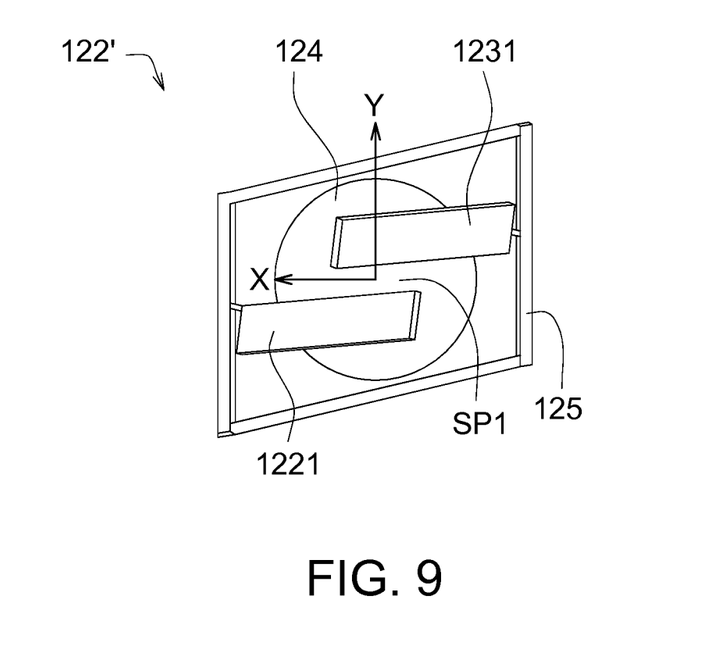
FIG. 9 is a schematic diagram of a beam splitting module according to another embodiment of the disclosure.

Referring to FIG. 9, a schematic diagram of a beam splitting module according to another embodiment of the disclosure is shown. In the present embodiment, the first reflective mirror 122 (comprises a first sub-reflective mirror 1221 and a second sub-reflective mirror 1222) and the second reflective mirror 123 (comprises a third sub-reflective mirror 1231 and a fourth sub-reflective mirror 1232) can be connected by a bracket 125 to form a one-piece type reflective mirror. For instance, the first sub-reflective mirror 1221 and the third sub-reflective mirror 1231 can be interconnected by the bracket 125 to form a one-piece type reflective mirror 122'. Although it is not illustrated in the diagram, the second sub-reflective mirror 1222 and the fourth sub-reflective mirror 1232 can also be interconnected by the same bracket 125 or another bracket to form another one-piece type reflective mirror. The one-piece type reflective mirror 122' has a space SP1 through which the third split image P3 (illustrated in FIG. 2) is reflected to form a third projection image S3 (illustrated in FIG. 3). The third projection image S3 is projected on the real image forming plate 130 (not illustrated) to form a third real image.

In another embodiment, the connection relationship between the first reflective mirror 122 and the second reflective mirror 123 is not limited to the embodiment of FIG. 9, and any connection relationship would do the first reflective mirror 122 and the second reflective mirror 123 can be interconnected to form a one-piece type reflective mirror. Besides, the first sub-reflective mirror 1221, the second sub-reflective mirror 1222, the third sub-reflective mirror 1231 and the fourth sub-reflective mirror 1232 can be integrally formed in one piece. Or, the first sub-reflective mirror 1221, the second sub-reflective mirror 1222, the third sub-reflective mirror 1231 and the fourth sub-reflective mirror 1232 can be temporarily or permanently connected by way of bonding, engagement, locking or fusion.

Figure 10:
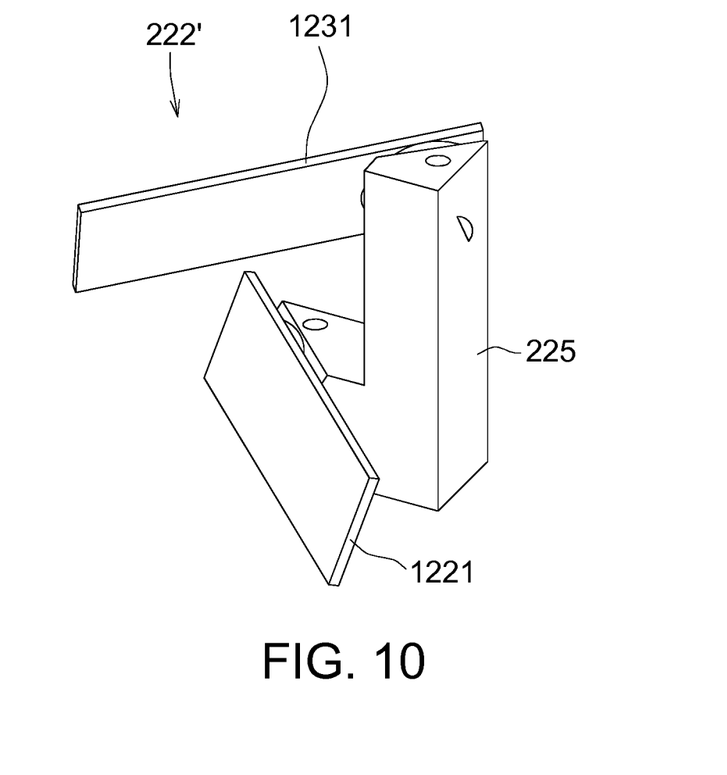
FIG. 10 is a schematic diagram of a beam splitting module according to another embodiment of the disclosure.

Referring to FIG. 10, a schematic diagram of a beam splitting module according to another embodiment of the disclosure is shown. In the present embodiment, the first reflective mirror 122 (comprises a first sub-reflective mirror 1221 and a second sub-reflective mirror 1222) and the second reflective mirror 123 (comprises a third sub-reflective mirror 1231 and a fourth sub-reflective mirror 1232) can be interconnected by an L-shaped bracket 125 to form a one-piece type reflective mirror 222'. For instance, the first sub-reflective mirror 1221 and the third sub-reflective mirror 1231 can be interconnected by the bracket 125 to form a one-piece type reflective mirror 222'. Although it is not illustrated in the diagram, the second sub-reflective mirror 1222 and the fourth sub-reflective mirror 1232 can be interconnected by the same bracket 125 or another bracket to form a one-piece type reflective mirror.

Although the quantity of split images is exemplified by 3 in above embodiments, the quantity of split images can be more than 3 in another embodiment, and the split images can be projected outward through a space or a reflective mirror of the beam splitting module.

Figure 11:
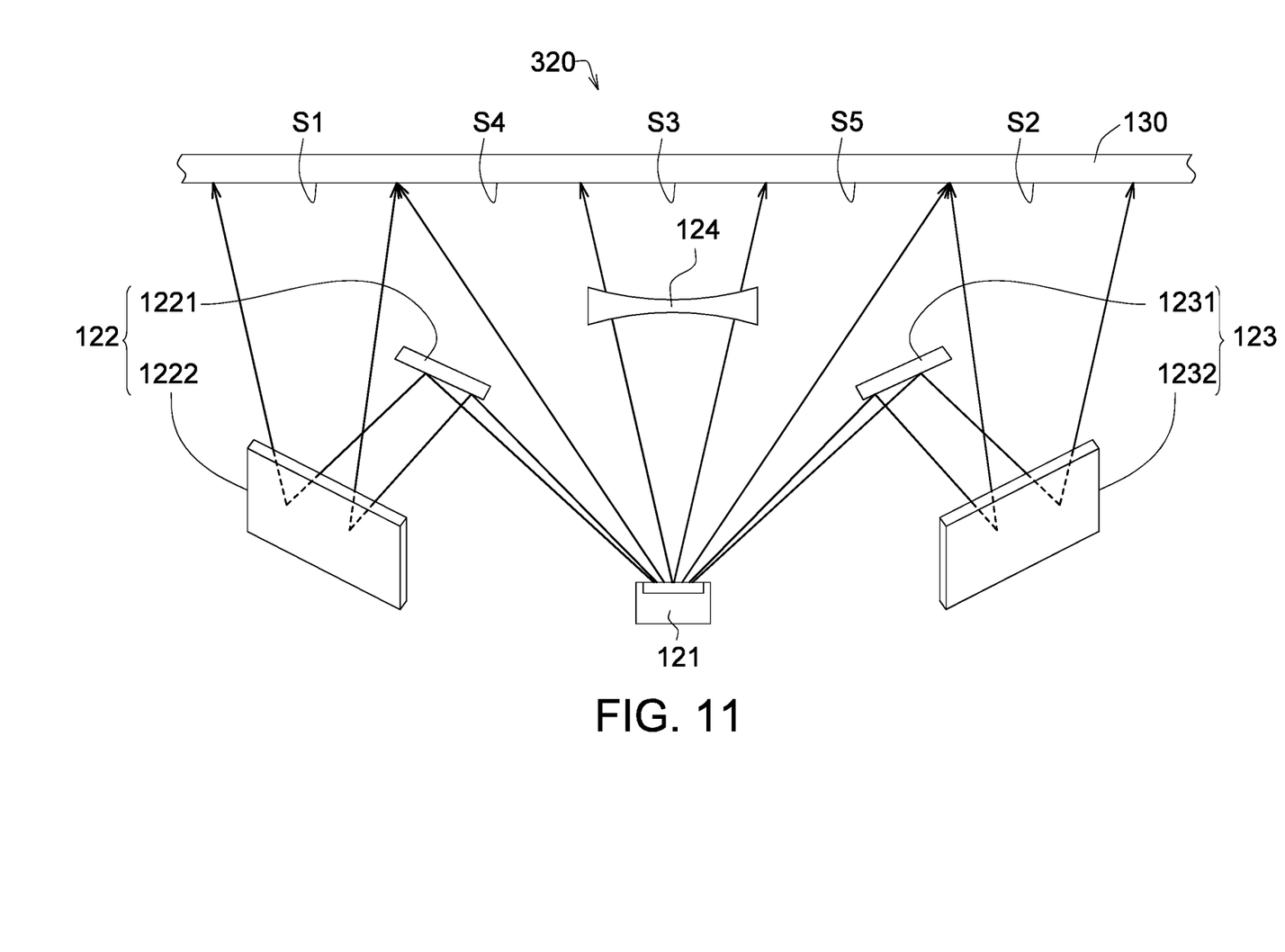
FIG. 11 is a schematic diagram of a beam splitting module according to another embodiment of the disclosure.

Referring to FIG. 11, a schematic diagram of a beam splitting module according to another embodiment of the disclosure is shown. Unlike the beam splitting module 120 of the previous embodiment, the projector 120 of the beam splitting module 320 of the present embodiment further projects a fourth split image and a fifth split image. The fourth split image S4 and the fifth split image S5 are reflected through the space of the beam splitting module 320 to form a fourth projection image S4 and a fifth projection image S5 respectively.

Figure 12:
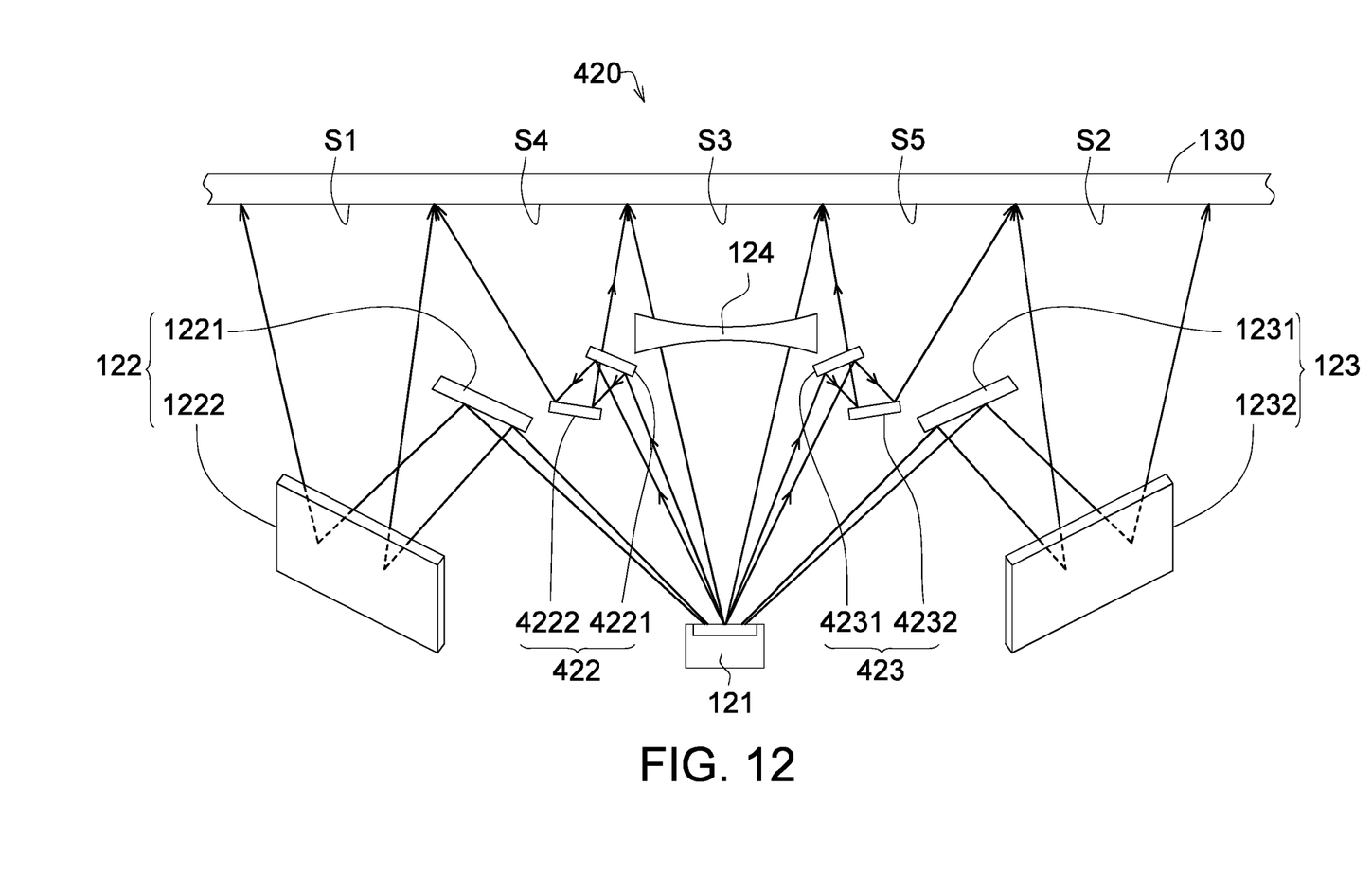
FIG. 12 is a schematic diagram of a beam splitting module according to another embodiment of the disclosure.

Referring to FIG. 12, a schematic diagram of a beam splitting module according to another embodiment of the disclosure is shown. Unlike the beam splitting module 320 of FIG. 11, the beam splitting module 420 of the present embodiment further comprises a fourth reflective mirror 422 and a fifth reflective mirror 423. The fourth reflective mirror 422 reflects the fourth split image to form a fourth projection image S4, and the fifth reflective mirror 423 reflects the fifth split image to form a fifth projection image S5.

In the present embodiment, the fourth reflective mirror 422 comprises a fifth sub-reflective mirror 4221 and a sixth sub-reflective mirror 4222. The fourth split image is sequentially reflected by the fifth sub-reflective mirror 4221 and the sixth sub-reflective mirror 4222 and projected on the real image forming plate 130 to form the fourth projection image S4. The structures of the fifth sub-reflective mirror 4221 and the sixth sub-reflective mirror 4222 are similar to that of the first sub-reflective mirror 1221, and the details are not repeated here for simplicity.

The fifth reflective mirror 423 comprises a seventh sub-reflective mirror 4231 and a sub-reflective mirror 4232. The fifth split image is sequentially reflected by the seventh sub-reflective mirror 4231 and the eighth sub-reflective mirror 4232 and projected on the real image forming plate 130 to form the fifth projection image S5.

Figure 13:
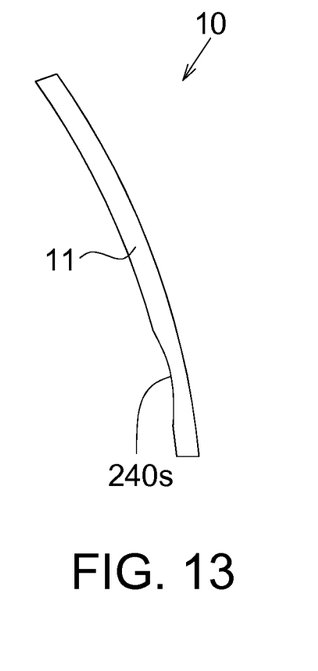
FIG. 13 is a schematic diagram of a windshield according to an embodiment of the disclosure.

Referring to FIG. 13, a schematic diagram of a windshield according to an embodiment of the disclosure is shown. A windshield 10 comprises a windshield body 11 and a concave profile 240s of the virtual image forming plate 240 as illustrated in FIG. 8; under such design, the projector device 100 can omit the virtual image forming plate 240. In addition, the concave profile 240s can be integrated into the windshield body 11 in a glass manufacturing process.

Figure 14:
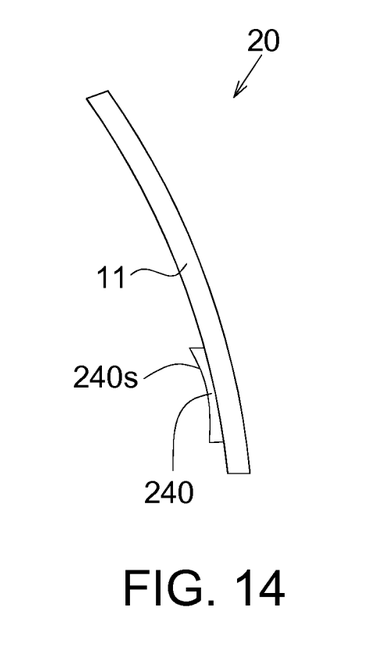
FIG. 14 is a schematic diagram of a windshield according to another embodiment of the disclosure.

Referring to FIG. 14, a schematic diagram of a windshield according to another embodiment of the disclosure is shown. A windshield 20 comprises a windshield body 11 and the virtual image forming plate 240, wherein the virtual image forming plate 240 can be adhered in the windshield body 11; under such design, the projector device 100 can omit the virtual image forming plate 240.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A beam splitting module, comprising: a projector for projecting a first split image, a second split image and a third split image; a first reflective mirror for reflecting the first split image to form a first projection image; a second reflective mirror for reflecting the second split image to form a second projection image; wherein, the third split image is projected through a space between the first reflective mirror and the second reflective mirror to form a third projection image; wherein the first split image, the second split image and the third split image are arranged along a first direction, and the first projection image, the second projection image and the third projection image are arranged along a second direction different from the first direction.

2. The beam splitting module according to claim 1, wherein the first direction is perpendicular to the second direction.

3. The beam splitting module according to claim 1, wherein the first direction is a vertical direction, and the second direction is a horizontal direction.

4. The beam splitting module according to claim 1, further comprising:
a real image forming plate, wherein the first projection image, the second projection image and the third projection image are projected on the real image forming plate to form a first real image, a second real image and a third real image respectively.

5. The beam splitting module according to claim 4, wherein the quantity of the real image forming plate is single.

6. The beam splitting module according to claim 1, wherein the first reflective mirror comprises a first sub-reflective mirror and a second sub-reflective mirror, a reflective surface of the first sub-reflective mirror faces towards the second sub-reflective mirror but faces away from a real image forming plate, a reflective surface of the second sub-reflective mirror faces towards the real image forming plate, and the first split image is sequentially reflected by the first sub-reflective mirror and the second sub-reflective mirror so as to be projected on the real image forming plate.

7. The beam splitting module according to claim 1, wherein the second reflective mirror comprises a third sub-reflective mirror and a fourth sub-reflective mirror, a reflective surface of the third sub-reflective mirror faces towards the fourth sub-reflective mirror but faces away from a real image forming plate, a reflective surface of the fourth sub-reflective mirror faces towards the real image forming plate, and the second split image is sequentially reflected by the third sub-reflective mirror and the third sub-reflective mirror so as to be projected on the real image forming plate.

8. The beam splitting module according to claim 1, further comprising:
a lens disposed between the first reflective mirror and the second reflective mirror for adjusting a size of the third split image.

9. The beam splitting module according to claim 1, wherein the first reflective mirror and the second reflective mirror are interconnected to form a one-piece type reflective mirror, and the one-piece type reflective mirror has the space.

10. The beam splitting module according to claim 1, wherein the first reflective mirror comprises a first sub-reflective mirror and a second sub-reflective mirror, the second sub-reflective mirror comprises a third sub-reflective mirror and a fourth sub-reflective mirror, the first sub-reflective mirror and the third sub-reflective mirror are interconnected to form a one-piece type reflective mirror, and the second sub-reflective mirror and the fourth sub-reflective mirror are interconnected to form another one-piece type reflective mirror.

11. The beam splitting module according to claim 1, wherein the projector further projects a fourth split image and a fifth split image, and the fourth split image and the fifth split image are projected through the space to form a fourth projection image and a fifth projection image respectively.

12. The beam splitting module according to claim 1, wherein the projector further projects a fourth split image and a fifth split image, and the beam splitting module further comprises:
a fourth reflective mirror for reflecting the fourth split image to form a fourth projection image; and
a fifth reflective mirror for reflecting the fifth split image to form a fifth projection image.

13. A projector device, comprising:
the beam splitting module according to claim 1; and
a real image forming plate, wherein the first projection image, the second projection image and the third projection image form a first real image, a second real image and a third real image respectively through the real image forming plate.

14. The projector device according to claim 13, further comprising:
a virtual image forming plate, wherein the first real image, the second real image and the third real image form a first virtual image, a second virtual image and a third virtual image respectively through the virtual image forming plate.

15. The projector device according to claim 13, wherein a virtual image forming plate is disposed on windshield, instrument panel, sun visor, rearview mirror or the beam splitting module, and the first real image, the second real image and the third real image form a first virtual image, a second virtual image and a third virtual image respectively through the virtual image forming plate.

16. The projector device according to claim 14, wherein the virtual image forming plate is a one-piece type concave semi-reflective mirror.

17. The projector device according to claim 14, wherein the virtual image forming plate comprises:
a virtual image forming lens, wherein the first real image, the second real image and the third real image form a first virtual image, a second virtual image and a third virtual image respectively through the virtual image forming plate; and
a semi-reflective mirror is separated from the virtual image forming lens, wherein the first virtual image, the second virtual image and the third virtual image are projected on a far position through the semi-reflective mirror.

18. A windscreen disposed in front of the projector device according to claim 13, comprising:
a windscreen body; and
a virtual image forming plate adhered in a windshield body, wherein the first real image, the second real image and the third real image form a first virtual image, a second virtual image and a third virtual image respectively through the virtual image forming plate.

19. A windscreen disposed in front of the projector device according to claim 13, comprising:
a windscreen body; and
a concave profile integrated into the windscreen body, wherein the first real image, the second real image and the third real image form a first virtual image, a second virtual image and a third virtual image respectively through the concave profile.

20. A beam splitting module, comprising: a projector for projecting a first split image, a second split image and a third split image; a first reflective mirror for reflecting the first split image to form a first projection image; a second reflective mirror for reflecting the second split image to form a second projection image; a third reflective mirror located between the first reflective mirror and the second reflective mirror for reflecting the third split image to form a third projection image; wherein the first split image, the second split image and the third split image are arranged along a first direction, and the first projection image, the second projection image and the third projection image are arranged along a second direction different from the first direction.

21. The beam splitting module according to claim 20, wherein the first direction is perpendicular to the second direction.

22. The beam splitting module according to claim 20, wherein the first direction is a vertical direction, and the second direction is a horizontal direction.

23. The beam splitting module according to claim 20, wherein the first reflective mirror comprises a first sub-reflective mirror and a second sub-reflective mirror, a reflective surface of the first sub-reflective mirror faces towards the second sub-reflective mirror and a real image forming plate, a reflective surface of the second sub-reflective mirror faces towards the real image forming plate, and the first split image is sequentially reflected by the first sub-reflective mirror and the second sub-reflective mirror so as to be projected on the real image forming plate.

24. The beam splitting module according to claim 20, wherein the second reflective mirror comprises a third sub-reflective mirror and a fourth sub-reflective mirror, a reflective surface of the third sub-reflective mirror faces towards the fourth sub-reflective mirror and a real image forming plate, a reflective surface of the fourth sub-reflective mirror faces towards the real image forming plate, and the second split image is sequentially reflected by the third sub-reflective mirror and the fourth sub-reflective mirror so as to be projected on the real image forming plate.

25. The beam splitting module according to claim 20, further comprising:
   a real image forming plate, wherein the first projection image, the second projection image and the third projection image are projected on the real image forming plate to form a first real image, a second real image and a third real image respectively.

26. The beam splitting module according to claim 25, wherein the quantity of the real image forming plate is single.

27. The beam splitting module according to claim 25, wherein the real image forming plate has a concave surface on which the first projection image, the second projection image and the third projection image are projected.

28. The beam splitting module according to claim 20, further comprising:
   an image correction unit for correcting at least one of the first projection image, the second projection image and the third projection image.

29. A projector device, comprising:
   the beam splitting module according to claim 20; and
   a real image forming plate, wherein the first projection image, the second projection image and the third projection image form a first real image, a second real image and a third real image respectively through the real image forming plate.

30. The projector device according to claim 29, further comprising:
   a virtual image forming plate, wherein the first real image, the second real image and the third real image form a first virtual image, a second virtual image and a third virtual image respectively through the virtual image forming plate.

31. The projector device according to claim 29, wherein a virtual image forming plate is disposed on windshield, instrument panel, sun visor, rearview mirror or the beam splitting module, and the first real image, the second real image and the third real image form a first virtual image, a second virtual image and a third virtual image respectively through the virtual image forming plate.

32. The projector device according to claim 30, wherein the virtual image forming plate is a one-piece type concave semi-reflective mirror.

33. The projector device according to claim 30, wherein the virtual image forming plate comprises:
   a virtual image forming lens, wherein the first real image, the second real image and the third real image form a first virtual image, a second virtual image and a third virtual image respectively through the virtual image forming plate; and
   a semi-reflective mirror is separated from the virtual image forming lens, wherein the first virtual image, the second virtual image and the third virtual image are projected on a far position through the semi-reflective mirror.

34. A windscreen disposed in front of the projector device according to claim 29, comprising:
   a windscreen body; and
   a virtual image forming plate adhered in a windshield body, wherein the first real image, the second real image and the third real image form a first virtual image, a second virtual image and a third virtual image respectively through the virtual image forming plate.

35. A windscreen disposed in front of the projector device according to claim 29, comprising:
   a windscreen body; and
   a concave profile integrated into the windscreen body, wherein the first real image, the second real image and the third real image form a first virtual image, a second virtual image and a third virtual image respectively through the concave profile.

* * * * *